United States Patent
Neiger et al.

(10) Patent No.: US 8,312,452 B2
(45) Date of Patent: Nov. 13, 2012

(54) METHOD AND APPARATUS FOR A GUEST TO ACCESS A PRIVILEGED REGISTER

(75) Inventors: Gilbert Neiger, Portland, OR (US);
Richard A. Uhlig, Hillsboro, OR (US);
Dion Rodgers, Hillsboro, OR (US);
Jason W. Brandt, Austin, TX (US);
Rajesh S. Parthasarathy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1443 days.

(21) Appl. No.: 11/173,312

(22) Filed: Jun. 30, 2005

(65) Prior Publication Data

US 2007/0006230 A1 Jan. 4, 2007

(51) Int. Cl.
*G06F 9/455* (2006.01)
*G06F 9/46* (2006.01)

(52) U.S. Cl. ............................. 718/1; 718/100; 718/108

(58) Field of Classification Search .................. 718/100, 718/1
See application file for complete search history.

(56) References Cited

U.S. PATENT DOCUMENTS

| | | | |
|---|---|---|---|
| 5,642,516 A * | 6/1997 | Hedayat et al. | 710/260 |
| 6,799,269 B2 * | 9/2004 | Dowling | 712/244 |
| 7,127,548 B2 * | 10/2006 | Bennett et al. | 711/6 |
| 7,209,994 B1 * | 4/2007 | Klaiber et al. | 710/264 |
| 7,418,584 B1 * | 8/2008 | Klaiber et al. | 712/229 |
| 7,426,728 B2 * | 9/2008 | Ruemmler et al. | 718/100 |
| 7,487,339 B2 * | 2/2009 | Uhler | 712/228 |
| 2004/0230794 A1 * | 11/2004 | England et al. | 713/164 |
| 2006/0010440 A1 * | 1/2006 | Anderson et al. | 718/1 |
| 2006/0021029 A1 * | 1/2006 | Brickell et al. | 726/22 |
| 2006/0085179 A1 * | 4/2006 | Hack et al. | 703/23 |
| 2006/0161917 A1 * | 7/2006 | Leung et al. | 718/100 |
| 2006/0236094 A1 * | 10/2006 | Leung et al. | 713/152 |
| 2006/0259734 A1 * | 11/2006 | Sheu et al. | 711/203 |

* cited by examiner

*Primary Examiner* — Emerson Puente
*Assistant Examiner* — Adam Lee
(74) *Attorney, Agent, or Firm* — Thomas R. Lane

(57) ABSTRACT

Embodiments of apparatuses and methods for guest processes to access registers are disclosed. In one embodiment, an apparatus includes an interface to a first register, shadow logic, evaluation logic, and exit logic. The shadow logic is to, in response to a guest attempt to write data to the first register, cause the data to be written to a second register. The evaluation logic is to determine, based on the value of the data, whether to transfer control to a host in response to the guest attempt. The exit logic is to transfer control to the host after the data is written to the second register if the evaluation logic determines to transfer control.

13 Claims, 3 Drawing Sheets

(12) United States Patent
US 8,312,452 B2

METHOD AND APPARATUS FOR A GUEST TO ACCESS A PRIVILEGED REGISTER

BACKGROUND

1. Field

The present disclosure pertains to the field of data processing, and more particularly, to the field of virtualizing resources in data processing apparatuses.

2. Description of Related Art

Generally, the concept of virtualization of resources in data processing apparatuses allows multiple instances of one or more operating systems (each, an "OS") to run on a single data processing apparatus, even though each OS is designed to have complete, direct control over the apparatus and its resources. Virtualization is typically implemented by using software (e.g., a virtual machine monitor, or a "VMM") to present to each OS a "virtual machine" ("VM") having virtual resources that the OS may completely and directly control, while the VMM maintains a system environment for implementing virtualization policies such as sharing and/or allocating the physical resources among the VMs (the "virtualization environment"). Each OS, and any other software, that runs on a VM, unaware of the virtualization environment, is referred to as a "guest" or as "guest software," while a "host" or "host software" is software, such as a VMM, that runs outside of, and may or may not be aware of, the virtualization environment.

A processor in a data processing apparatus may support virtualization, for example, by supporting an instruction to enter a virtualization environment to run a guest on a VM. In the virtualization environment, certain events, operations, and situations, such as external interrupts or attempts to access privileged registers or resources, may be "intercepted," i.e., cause the processor to exit the virtualization environment so that a VMM may operate, for example, to implement virtualization policies. A processor may also support other instructions for maintaining a virtualization environment, and may include register bits that indicate or control virtualization capabilities of the processor.

BRIEF DESCRIPTION OF THE FIGURES

The present invention is illustrated by way of example and not limitation in the accompanying figures.

DETAILED DESCRIPTION

Embodiments of apparatuses and methods for a guest to access a privileged register are described. In the following description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

The performance of a virtualization environment may be improved if the frequency of intercepted events is minimized. If the VMM's virtualization policy for a particular privileged register is sufficiently simple and if the processor provides appropriate support, guest software may be allowed to read and write a shadow copy of the register, with exits from the virtualization environment occurring only when the shadow is written with a value that satisfies evaluation criteria specified by the VMM.

The described apparatuses and methods may be used to support the virtualization of a privileged register and may be desirable to provide improved performance in a virtualization environment. In one embodiment, they may be used to support the virtualization of the task priority register ("TPR") of an Advanced Programmable Interrupt Controller ("APIC") in a processor in the Pentium® Processor Family. In this embodiment, performance may be improved over a virtualization environment in which all guest accesses to the TPR are intercepted by a VMM, by eliminating the need for a VMM intercept on some guest accesses to the TPR.

Figure 1:
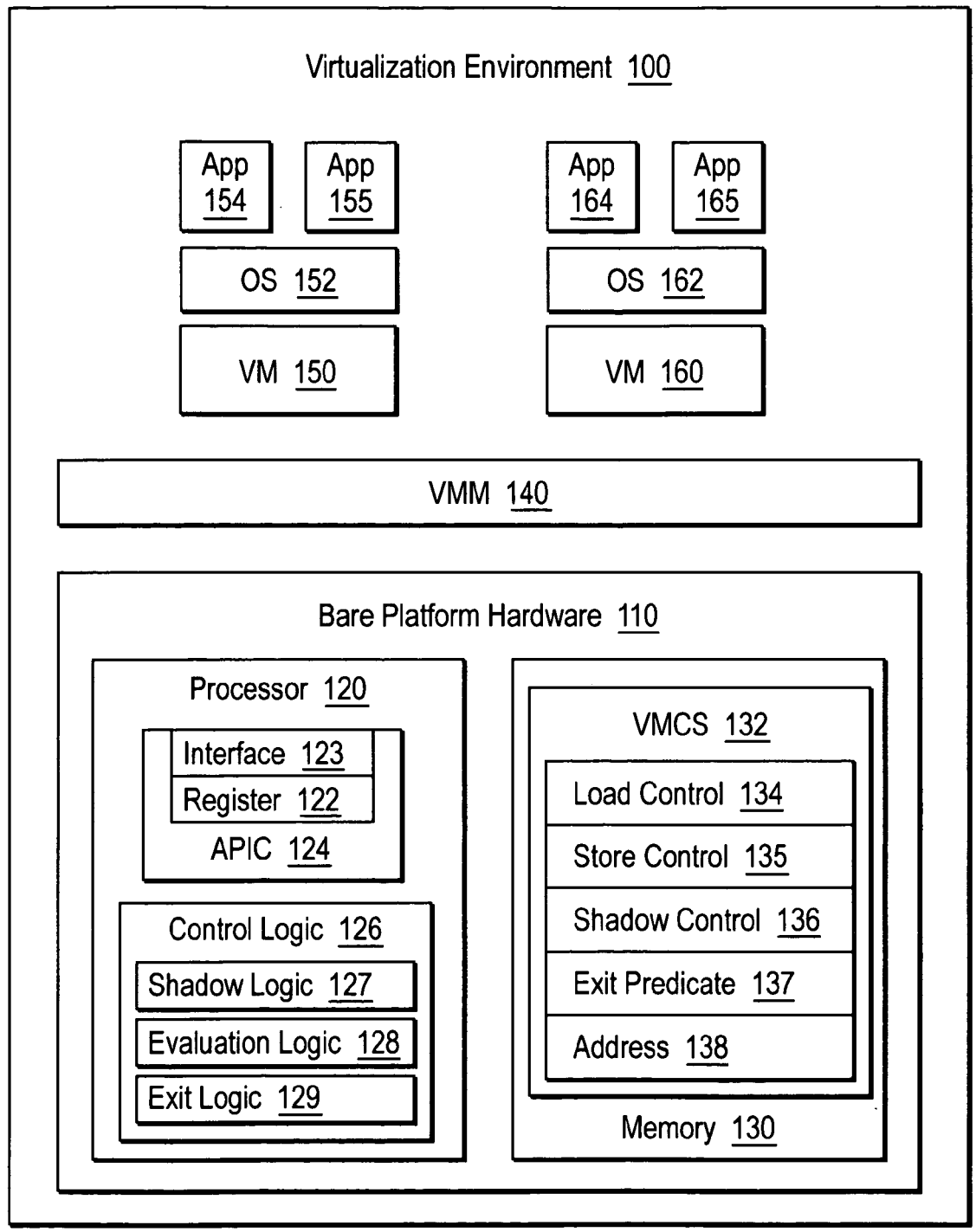
FIG. 1 illustrates a virtualization environment, in which an embodiment of the present invention may operate.

FIG. 1 illustrates virtualization environment 100, in which an embodiment of the present invention may operate. In FIG. 1, bare platform hardware 110 may be any data processing apparatus capable of executing any OS or VMM software. For example, bare platform hardware may be that of a personal computer, mainframe computer, portable computer, handheld device, set-top box, or any other computing system.

Bare platform hardware 110 includes processor 120 and memory 130. Processor 120 may be any type of processor, including a general purpose microprocessor, such as a processor in the Pentium® Processor Family, the Itanium® Processor Family, or other processor family from Intel Corporation, or another processor from another company, or a digital signal processor or microcontroller. Although FIG. 1 shows only one such processor 120, bare platform hardware 110 may include any number of processors. Memory 130 may be static or dynamic random access memory, semiconductor-based read only or flash memory, magnetic or optical disk memory, any other type of medium readable by processor 120, or any combination of such mediums. Bare platform hardware 110 may also include any number of input/output or other devices.

VMM 140 may be any software, firmware, or hardware host installed on or accessible to bare platform hardware 110, to present VMs, i.e., abstractions of bare platform hardware 110, to guests, or to otherwise create VMs, manage VMs, and implement virtualization policies within virtualization environment 100. In other embodiments, a host may be any VMM, hypervisor, OS, or other software, firmware, or hardware capable of controlling bare platform hardware 110. A guest may be any OS, any VMM, including another instance of VMM 140, any hypervisor, or any application or other software.

Each guest expects to access physical resources, such as processor and platform registers, memory, and input/output devices, of bare platform hardware 110, according to the architecture of the processor and the platform presented in the VM. FIG. 1 shows two VMs, 150 and 160, with guest OS 152 and guest applications 154 and 155 installed on VM 150 and guest OS 162 and guest applications 164 and 165 installed on VM 160. Although FIG. 1 shows only two VMs and two applications per VM, any number of VMs may be created, and any number of applications may run on each VM within the scope of the present invention.

A resource that can be accessed by a guest may either be classified as a "privileged" or a "non-privileged" resource. For a privileged resource, VMM 140 facilitates the functionality desired by the guest while retaining ultimate control over the resource. Non-privileged resources do not need to be controlled by VMM 140 and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "events" herein. Some of these events are "privileged" because they must be handled by VMM 140 to ensure proper operation of VMs 150 and 160, protection of VMM 140 from guests, and protection of guests from each other.

At any given time, processor 120 may be executing instructions from VMM 140 or any guest, thus VMM 140 or the guest may be running on, or in control of, processor 120. When a privileged event occurs or a guest attempts to access a privileged resource, control may be transferred from the guest to VMM 140. The transfer of control from a guest to VMM 140 is referred to as a "VM exit" herein. After handling the event facilitating the access to the resource appropriately, VMM 140 may return control to a guest. The transfer of control from VMM 140 to a guest is referred to as a "VM entry" herein.

In the embodiment of FIG. 1, processor 120 controls the operation of VMs 150 and 160 according to data stored in virtual machine control structure ("VMCS") 132. VMCS 132 is a structure that may contain state of a guest or guests, state of VMM 140, execution control information indicating how VMM 140 is to control operation of a guest or guests, information regarding VM exits and VM entries, any other such information. Processor 120 reads information from VMCS 132 to determine the execution environment of a VM and constrain its behavior. In this embodiment, VMCS 132 is stored in memory 130. In some embodiments, multiple VMCSs are used to support multiple VMs. Although FIG. 1 shows VMCS 132 stored in memory 130, storing a VMCS in a memory is not required by the present invention.

Processor 120 may include privileged register 122, which may be any control, configuration, or other register within processor 120. For example, privileged register 122 may be the TPR of APIC 124 in processor 120. In other embodiments, privileged register 122 may be any control, configuration, or other register within any device accessible to processor 120.

Processor 120 also includes interface 123 to privileged register 122. Interface 123 may be any interface to access a register, such as an internal bus, port, or point to point connection, or, in an embodiment where privileged register 122 is in a device other than processor 120, an external bus, port, or point to point connection.

Additionally, processor 120 includes control logic 126 to support virtualization, including the virtualization of access to privileged register 122. Control logic 126 may be microcode, programmable logic, hard-coded logic, or any other form of control logic within processor 120. In other embodiments, control logic 126 may be implemented in any form of hardware, software, or firmware, such as a processor abstraction layer, within a processor or within any device accessible or medium readable by a processor, such as memory 130.

VMCS 132 may include fields, control bits, or other data structures to support the virtualization of privileged register 122. Load-control bit 134 may be set to cause all attempts by a guest to write to privileged register 122 to result in a VM exit. Store-control bit 135 may be set to cause all attempts by a guest to read from privileged register 122 to result in a VM exit. Shadow-control bit 136 may be set to enable shadowing of privileged register 122, as described below. Exit-predicate field 137 may be used to store a value or values to be used to determine whether a VM exit results from a write to privileged register 122 when shadowing of privileged register 122 is enabled. For example, where privileged register 122 is a TPR, exit-predicate field 137 may be a four-bit field to store a threshold value to be compared to the value written to the shadow register for the TPR. The result of the comparison determines whether a VM exit occurs.

Although one specific example of a determination of whether a VM exit results from an access to privileged register 122 when shadowing is enabled is given above, the determination may be made according to any other evaluation criteria, or "exit criteria," within the scope of the present invention. Another specific example may be given in an embodiment where the value desired to be written to privileged register 22 is a 32-bit value ("S"), and exit-predicate field 137 includes 32 bits (or there are two exit-predicate fields, "A" and "B," which each include 16 bits). The exit criteria may be the following: an exit occurs if the value in the high 16 bits of S is greater than the value in A, and the logical-AND of the low 16 bits of S with the value in B is zero. In other words, no exit occurs if the value in the high 16 bits of S is less than or equal to the value in A, or the logical-AND of the low 16 bits of S with the value in B is non-zero.

Also in VMCS 132, address field-138 may be used to store an address of a memory location at which a shadow of privileged register 122 may be stored. For example, where privileged register 122 is a TPR, address field 138 may be a 64-bit field determining the location in memory of a virtual APIC page, such that a shadow of the TPR may be stored in bits 7:4 of the TPR field in the virtual APIC page. In an alternative embodiment, VMCS 132 may include a field to directly store a shadow copy of a value desired to be stored in privileged register 122, rather than a pointer to a memory location for the value. For example, VMCS 132 may include a four-bit field to directly store a shadow copy of a value desired to be stored in a TPR.

Control logic 126 causes processor 120 to execute method embodiments of the present invention, such as the method embodiment illustrated in below in FIG. 3, for example, by causing processor 120 to include the execution of one or more micro-operations, e.g., to support virtualization, in its response to virtualization instructions or other instructions from a host or guest. Control logic 126 includes shadow logic 127, evaluation logic 128, and exit logic 129.

Figure 2:
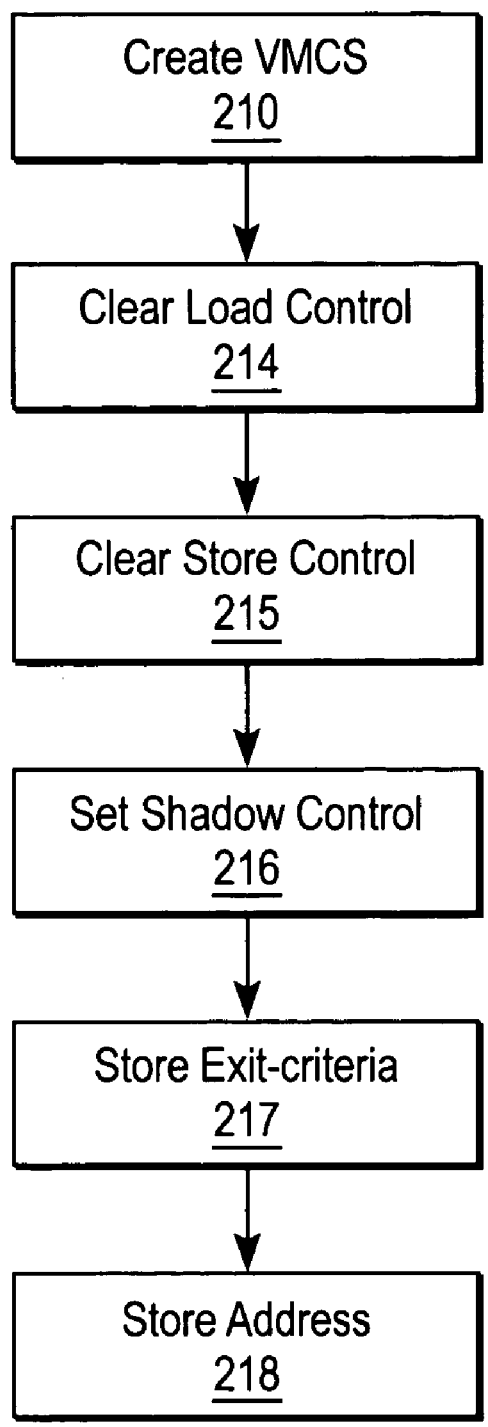
FIG. 2 illustrates an embodiment of the present invention in a method for a VMM to initialize support for a guest to access a privileged register.
Figure 3:
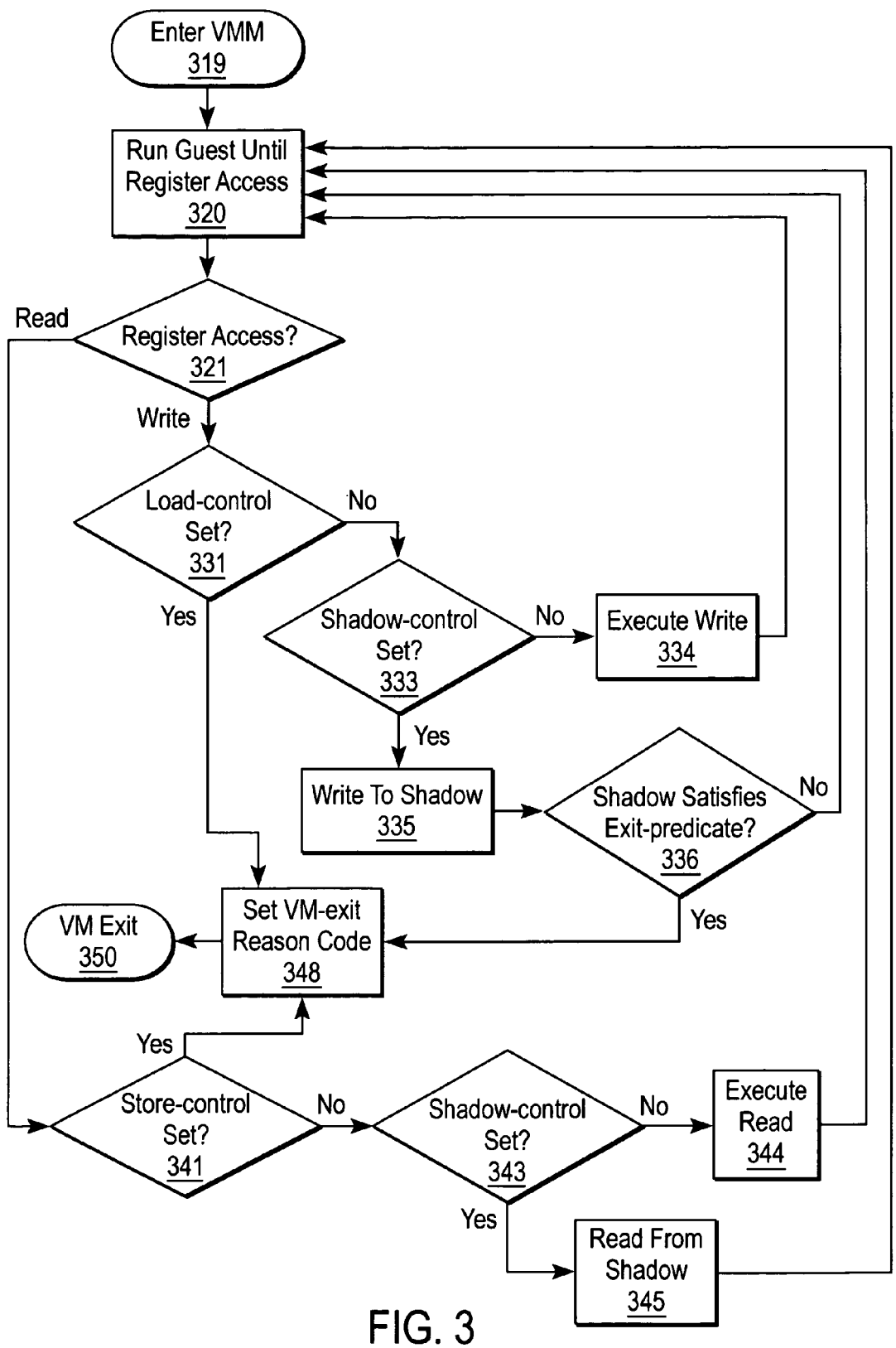
FIG. 3 illustrates an embodiment of the present invention in a method for a guest to access a privileged register.

FIGS. 2 and 3 illustrate method embodiments of the present invention. Although method embodiments are not limited in this respect, reference is made to virtualization environment 100 of FIG. 1 to describe the method embodiments of FIGS. 2 and 3.

FIG. 2 illustrates an embodiment of the present invention in a method for a VMM to initialize support for a guest to access a privileged register.

In box 210 of FIG. 2, VMM 140 of FIG. 1 creates a VMCS for a VM. In boxes 214 through 218, VMM 140 configures VMCS 132 to implement shadowing of privileged register 122. In boxes 214 and 215, load-control and store-control bits 134 and 135, respectively, are cleared, to prevent all write and read accesses, respectively, to privileged register 122 from unconditionally causing VM exits. In box 216, shadow-control bit 136 is set to enable shadowing of privileged register 122.

In box 217, exit-predicate values are stored in exit-predicate fields 137. The exit-predicate values may be chosen based on any criteria for managing guest operation, virtualization policies, performance, or other factors. For example, where privileged register 122 is a TPR, a single exit-predicate value may be chosen to be the lowest task priority level that a guest is allowed to write to the TPR without causing a VM exit.

In box 218, an address of a memory location for storing a shadow of privileged register 122 is written to address field 138. As described above, the address may be a base address to which an offset may be added to determine the address of the memory location to be used as the shadow register, or the address may be the address of the shadow register. Alternatively, the shadowed value may be stored directly in a VMCS, rather than a pointer to the shadowed value.

FIG. 3 illustrates an embodiment of the present invention in a method for a guest to access a privileged register.

In box 319 of FIG. 3, a VM entry is performed and control is transferred to a guest. In box 320, the guest begins or continues to run on the VM. In box 321, the guest attempts to access privileged register 122.

The attempted access in box 321 may be a write, for example, through an instruction to write data to privileged register 122. In one embodiment, the guest may be attempting to configure a TPR by writing data with a value that represents the priority level of the guest's currently executing task, so that the APIC will interrupt the guest by delivering an interrupt to processor 120 only if the priority level of the interrupt exceeds the value.

The guest may be attempting to write to privileged register 122 according to any known approach. In one embodiment, the guest may be attempting to write data to a control register using an instruction in the instruction set of processor 120 that provides for access to a control register, such as the MOV to CR8 instruction in the instruction set architecture ("ISA") of a processor in the Pentium® Processor Family. In another embodiment, a guest may be attempting to write to a memory-mapped register, for example, by using an instruction to write data to a memory location having an address that has been assigned to, dedicated to, or otherwise corresponds to, the desired register.

Alternatively, the attempted access in box 321 may be a read, for example, through an instruction to read data from privileged register 122. In one embodiment, the guest may be attempting to read the priority level of the guest's currently executing task from a TPR. The guest may be attempting to read from privileged register 122 according to any known approach. In one embodiment, the guest may be attempting to read data from a control register using an instruction in the instruction set of processor 120 that provides for access to a control register, such as the MOV from CR8 instruction in the ISA of a processor in the Pentium® Processor Family. In another embodiment, a guest may be attempting to read from a memory-mapped register, for example, by using an instruction to read data from a memory location having an address that has been assigned to, dedicated to, or otherwise corresponds to, the desired register.

If the attempted access in box 321 is a write access, flow continues at box 331. In box 331, load-control bit 134 is checked to determine if control should be transferred to a host, for example, through a VM exit. If load-control bit 134 is set, control proceeds to box 348, where a reason code for a VM exit may be stored in VMCS 132. For example, if arriving at box 348 from box 331, the VM-exit reason code may be "write to CR8" and the processor state saved in VMCS 132 may reflect the processor state before execution of the write instruction to privileged register 122 (i.e., the saved execution instruction pointer may reference the MOV to CR8 instruction). Then, a VM exit occurs in box 350.

If, in box 331, load-control bit 134 is not set, then, in box 333, shadow-control bit 136 is checked to determine if shadowing is enabled. If shadow-control bit 136 is not set, then the guest's attempt to write to privileged register 122 is executed in box 334, and control returns to box 320. If shadow-control bit 136 is set, then shadow logic 127 causes the data desired to be written to privileged register 122 in box 322 to instead be written to a shadow register in box 335.

The shadow register of box 335 may be a memory location determined as discussed with respect to box 218, a memory location in a VMCS, a hardware register in processor 120 or elsewhere in bare platform hardware 110, or any other storage location accessible to processor 120. In some embodiments, only a portion of the data may be written to the shadow register. For example, a MOV to CR8 instruction may cause only bits 3:0 of the source operand to be written to the TPR shadow.

Then, in box 336, evaluation logic 128 causes processor 120 to determine whether to transfer control from the guest to a host, for example, through a VM exit. The determination may be based on the value of the data stored in the shadow register and the value or values of the stored in the exit-predicate field or fields associated with the shadow register. In one embodiment, that value stored in the shadow register is compared to the value stored in exit-predicate field 137. For example, where privileged register 122 is a TPR, if the value stored in the TPR shadow is greater than or equal to the exit-predicate value, control returns to box 320. If not, control proceeds to box 348, where a reason code for a VM exit may be stored in VMCS 132. For example, if arriving at box 348 from box 336, the VM-exit reason code may be "TPR below threshold" and the processor state saved in VMCS 132 may reflect the processor state after execution of the write instruction to privileged register 122 (i.e., the saved execution instruction pointer may reference the instruction after the MOV to CR8 instruction). Then, exit logic 129 causes a VM exit to occur in box 350.

However, if the attempted access in box 321 is a read access, flow continues at box 341. In box 341, store-control bit 135 is checked to determine if control should be transferred to a host, for example, through a VM exit. If store-control bit 135 is set, control proceeds to box 348, where a reason code for a VM exit may be stored in VMCS 132. For example, if arriving at box 348 from box 341, the VM-exit reason code may be "store of CR8" and the processor state saved in VMCS 132 may reflect the processor state before execution of the read instruction to privileged register 122 (i.e., the saved execution instruction pointer may reference the MOV from CR8 instruction). Then, a VM exit occurs in box 350.

If, in box 341, store-control bit 135 is not set, then, in box 343, shadow-control bit 136 is checked to determine if shadowing is enabled. If shadow-control bit 136 is not set, then the guest's attempt to read from privileged register 122 is executed in box 344, and control returns to box 320. If shadow-control bit 136 is set, then, in box 345, shadow logic 127 causes the contents of the shadow register to be read into the destination operand of the read instruction. In some embodiments, only a portion of the data may be read from the shadow register. For example, a MOV from CR8 instruction may cause the TPR shadow to be written to bits 3:0 of the destination operand, and the other bits of the destination operand are cleared. Then, control returns to box 320.

Within the scope of the present invention, the methods illustrated in FIGS. 2 and 3 may be performed in a different order, with illustrated boxes omitted, with additional boxes added, or with a combination of reordered, omitted, or additional boxes. For example, where load-control and store-control bits 134 and 135 are clear by default, boxes 214 and 215, in which load-control and store-control bits 134 and 135, respectively, are cleared, may be omitted. For another example, in an embodiment without shadowing of privileged register 122, the determination of whether to transfer control to a host in box 336 may be based on the on the value of the data to be written to privileged register 122 in box 336 instead of the value of the data stored in a shadow register.

Processor 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses and methods for a guest to access a privileged register have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
    an interface to a task priority register of an advanced programmable interrupt controller;
    shadow logic to, in response to a guest attempt to write a task priority value to the task priority register, cause the task priority value to be written to a shadow location in a memory instead of the task priority register;
    evaluation logic to determine, based on a comparison of the task priority value to an exit-predicate value stored in a virtual machine control structure, whether to transfer control to a host in response to the guest attempt; and
    exit logic to transfer control to the host after the task priority value is written to the shadow location if the evaluation logic determines to transfer control to the host.

2. The processor of claim 1, wherein the shadow logic is also to cause the task priority value to be read from the shadow location when the guest attempts to read the task priority value from the task priority register.

3. The processor of claim 1, wherein the host is a virtual machine monitor and the shadow location is in the virtual machine control structure.

4. The processor of claim 1, wherein the host is a virtual machine monitor and the shadow location is a memory location specified by an address stored in the virtual machine control structure.

5. The processor of claim 1, further comprising the task priority register.

6. The processor of claim 1, wherein the attempt is made by an instruction to move the task priority value into the task priority register.

7. The processor of claim 1, wherein the attempt is made by an instruction to store the task priority value in the memory.

8. The processor of claim 1, wherein the task priority value is to be used to determine whether the guest is to be interrupted.

9. The processor of claim 8, wherein the determination of whether the guest is to be interrupted is based on a comparison of the task priority value to an interrupt priority value.

10. A method comprising:
    attempting, by a guest, to write a task priority value to a task priority register of an advanced programmable interrupt controller;
    writing the task priority value to a shadow location in a memory instead of the task priority register;
    determining, based on a comparison of the task priority value to an exit-predicate value stored in a virtual machine control structure, to transfer control from the guest to a virtual machine monitor; and
    transferring control from the guest to the virtual machine monitor after writing the task priority value to the shadow location.

11. The method of claim 10, further comprising:
    attempting to read the task priority value from the task priority register; and reading the task priority value from the shadow location instead of the task priority register.

12. A system comprising:

a memory to store a control structure for a virtual machine; and a processor including:

an interface to a task priority register of an advanced programmable interrupt controller;

shadow logic to, in response to a guest attempt to write a task priority value to the task priority register, cause the task priority value to be written to a shadow location in the memory instead of the task priority register;

evaluation logic to determine, based on a comparison of the task priority value to an exit-predicate value stored in the virtual machine control structure, whether to transfer control to a host in response to the guest attempt; and exit logic to transfer control to the host after the task priority value is written to the shadow location if the evaluation logic determines to transfer control to the host.

13. The system of claim 12, wherein the shadow location is in one of the control structure and a memory location specified by the control structure.

* * * * *